(12) United States Patent
Kanehara et al.

(10) Patent No.: US 6,997,836 B2
(45) Date of Patent: Feb. 14, 2006

(54) BELT FOR CONTINUOUSLY VARIABLE TRANSMISSION

(75) Inventors: Shigeru Kanehara, Saitama (JP); Mamoru Arikawa, Saitama (JP); Toru Yagasaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 186 days.

(21) Appl. No.: 10/455,803

(22) Filed: Jun. 6, 2003

(65) Prior Publication Data

US 2004/0067808 A1 Apr. 8, 2004

(30) Foreign Application Priority Data

Jun. 11, 2002 (JP) .................................. 2002-170341

(51) Int. Cl.
*F16G 1/14* (2006.01)

(52) U.S. Cl. ....................... 474/242; 474/201
(58) Field of Classification Search ................ 474/201, 474/238, 240, 242, 244, 245, 246
See application file for complete search history.

(56) References Cited

U.S. PATENT DOCUMENTS

| 4,332,575 A | 6/1982 | Hendriks .................... 474/201 |
| 4,676,768 A | 6/1987 | Miranti, Jr. et al. |
| 6,090,004 A * | 7/2000 | Kanehara et al. ............ 474/242 |
| 6,273,837 B1 | 8/2001 | Yoshida et al. |
| 6,629,904 B1 * | 10/2003 | Fujioka et al. .............. 474/242 |

FOREIGN PATENT DOCUMENTS

| EP | 0 909 907 A1 | 4/1999 |
| EP | 1 184 591 A1 | 3/2002 |
| JP | 61-079041 | 4/1986 |
| JP | 2-22254 | 5/1990 |
| JP | 5-56415 | 8/1993 |
| WO | WO 99/59751 | 11/1999 |

* cited by examiner

Primary Examiner—David A. Bucci
Assistant Examiner—Vicky A. Johnson
(74) Attorney, Agent, or Firm—Arent Fox PLLC

(57) ABSTRACT

Protrusions formed on an inner peripheral surface of at least an innermost metal ring of a belt for a continuously variable transmission are initially worn. An average contact width $\underline{w}$ of the protrusions, measured in a direction perpendicular to a direction of travel of the metal ring, is equal to or less than 16 $\mu$m. The development of pitching at a top of the protrusion in a depthwise direction is inhibited. Shallow pitching is eliminated due to the contact between the protrusion and a metal element, which prevents the generation of cracks. When the metal ring and the metal element are conformed to each other, the average Hertz's surface pressure is lowered, whereby the pitching is difficult to occur. Also, the top of the protrusion is worn, leading to an improved surface roughness, whereby the lubrication is enhanced, resulting in an enhancement of metal ring durability.

1 Claim, 9 Drawing Sheets

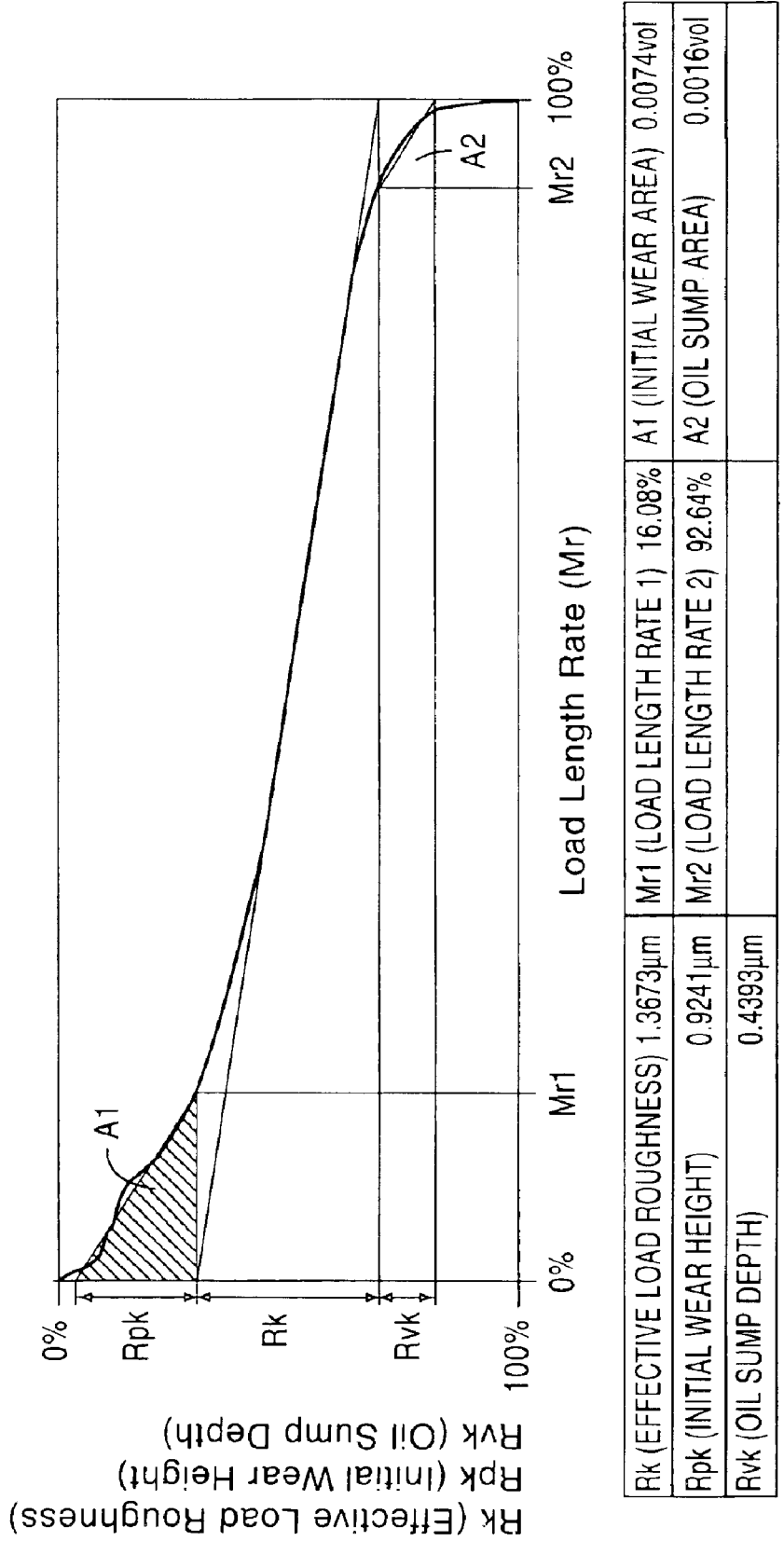

BELT FOR CONTINUOUSLY VARIABLE TRANSMISSION

BACKGROUND OF THE INVENTION

1. Field of the Invention

The present invention relates to a belt for a continuously variable transmission, including a plurality of metal elements supported on a metal ring assembly having a plurality of metal rings laminated on one another and which transmit a driving force between a driving pulley and a driven pulley.

2. Description of the Related Art

A conventional belt for a continuously variable transmission is disclosed in Japanese Patent Publication No. 5-56415 and Japanese Patent Publication No. 2-22254. In the belt described in Japanese Patent Publication No. 5-56415, a plurality of mountain-range-shaped protrusions are arranged in a mesh shape on each metal ring. As a result, an appropriate friction coefficient that centers the metal rings and appropriate lubrication between the adjacent metal rings are ensured. In the belt described in Japanese Patent Publication No. 2-22254, a plurality of mesh-shaped grooves are formed on a surface of each metal ring. The friction coefficient between adjacent metal rings is reduced, which enhances the transmitting efficiency of the metal belt.

An inner peripheral surface of the innermost metal ring of the metal ring assembly is exposed to severe conditions relative to the other metal rings as it is brought into direct contact with saddle faces of the metal elements. Therefore, the durability of the innermost metal ring understandably plays a large role in influencing the durability of the entire metal belt. If mountain-range-shaped protrusions are formed on the inner peripheral surface of the innermost metal ring to enhance the oil-retaining property, the saddle faces of the metal elements are disadvantageously brought into contact with the protrusions and generate pitching (i.e., very small cracks), which, over time, grow larger and ultimately decrease durability.

SUMMARY OF THE INVENTION

It is an object of the present invention to overcome the drawbacks of the above-described conventional belts for a continuously variable transmission.

It is also an object of the present invention to enhance the durability of metal rings in a belt for a continuously variable transmission having mountain-range-shaped protrusions formed on an inner peripheral surface of at least the innermost metal ring.

To achieve the above objects, according to the present invention, there is provided a belt for a continuously variable transmission, including a plurality of metal elements supported on a metal ring assembly having a plurality of metal rings laminated on one another and which transmit a driving force between a driving pulley and a driven pulley. At least an innermost metal ring has mountain-range-shaped protrusions formed on an inner peripheral surface thereof. An average contact width $\underline{w}$ of the mountain-range-shaped protrusions, after initially being worn and as measured in a direction perpendicular to a direction of travel of the metal rings, is defined by the following equation:

$$w = L \times (Mr1/HSC).$$

The average contact width $\underline{w}$ of the mountain-range-shaped protrusions are so defined using a length L of at least a portion of the metal ring measured in the direction perpendicular to the direction of travel, a load length rate 1, Mr1 within the length L of the inner peripheral surface, and a high spot count HSC within the length L of the inner peripheral surface. The high spot count HSC is defined as the number of protrusions having a height exceeding a height at the load length rate 1, Mr1. The high spot count HSC can also be defined as the number of the protrusions having a height exceeding a height obtained by adding one half of an effective load roughness Rk to a height where a total area of projections and a total area of recesses in sections of the protrusions equal each other, wherein the average contact width $\underline{w}$ is equal to or smaller than 16 $\mu$m.

With the above arrangement, when the mountain-range-shaped protrusions formed on the inner peripheral surface of at least the innermost metal ring of the belt have initially been worn, the generation or development of pitching at a top of a narrow protrusion is inhibited, because the average contact width $\underline{w}$ of the protrusions, as measured in the direction perpendicular to the direction of travel, is equal to or smaller than 16 $\mu$m. A shallow pitching can also be eliminated by the wear due to the contact between the protrusion and the metal element, which prevents the generation of durability decreasing cracks. If the width of the protrusion, as measured in the direction perpendicular to the direction of travel of the metal ring, is reduced, the width of the protrusion, as measured in the direction of travel, is also reduced. As a result, an oil membrane at the top of the protrusion is prevented from being cut, which also prevents the generation of cracks. When the metal ring and the metal element are conformed to each other, the average Hertz's surface pressure is lowered. As a result, it is difficult for pitching to occur. Also, the top of the protrusion is worn, resulting in very good and desirable surface roughness, wherein lubrication is enhanced along with overall belt durability.

The above and other objects, features and advantages of the present invention will become apparent from the following description of the preferred embodiment taken in conjunction with the accompanying drawings.

BRIEF DESCRIPTION OF THE DRAWINGS

FIG. 9 is a load curve corresponding to FIG. 8.

DETAILED DESCRIPTION OF THE PREFERRED EMBODIMENT

The present invention will now be described by way of a preferred embodiment with reference to the accompanying drawings.

Figure 2:
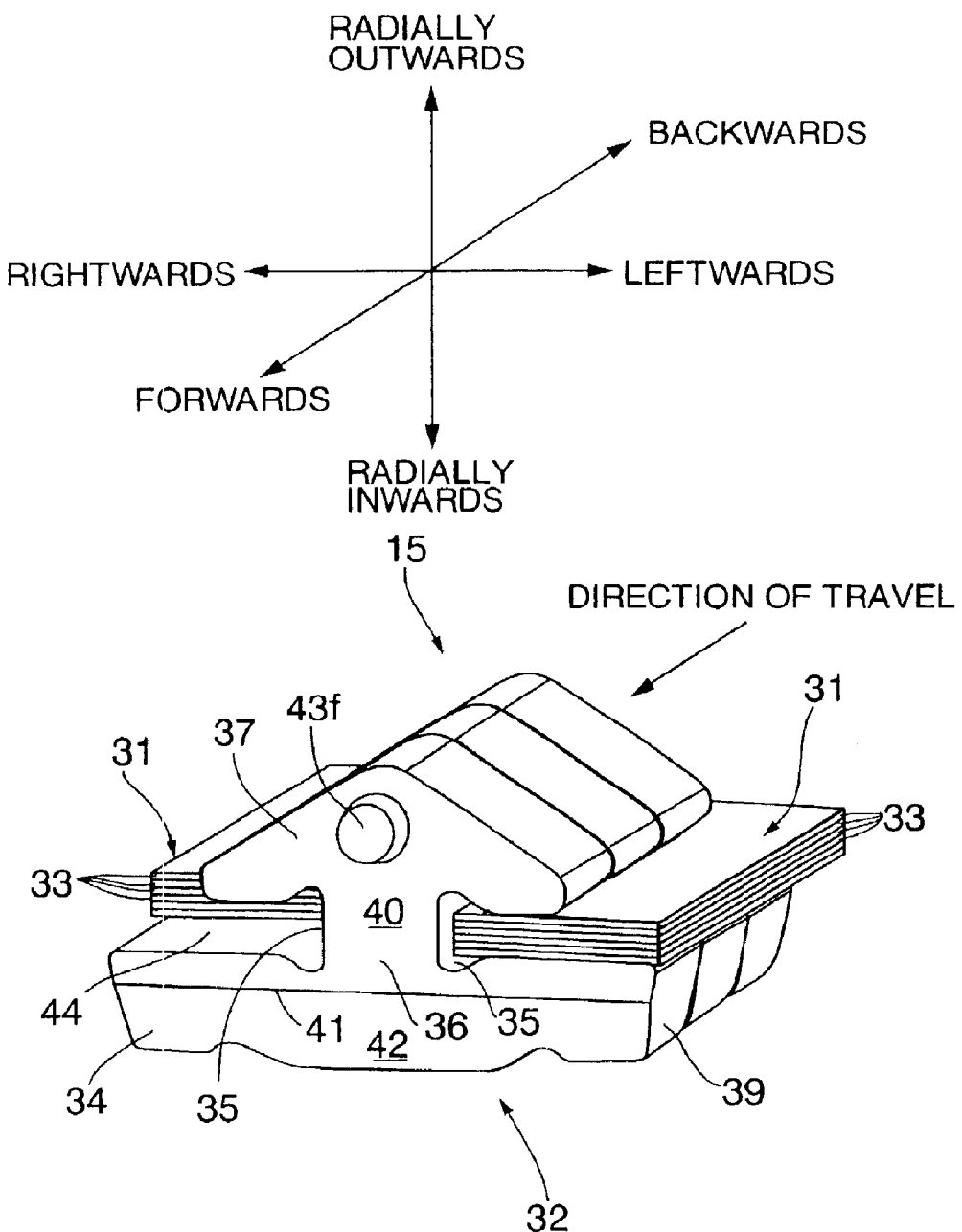
FIG. 2 is a partial perspective view of a metal belt.
Figure 3:
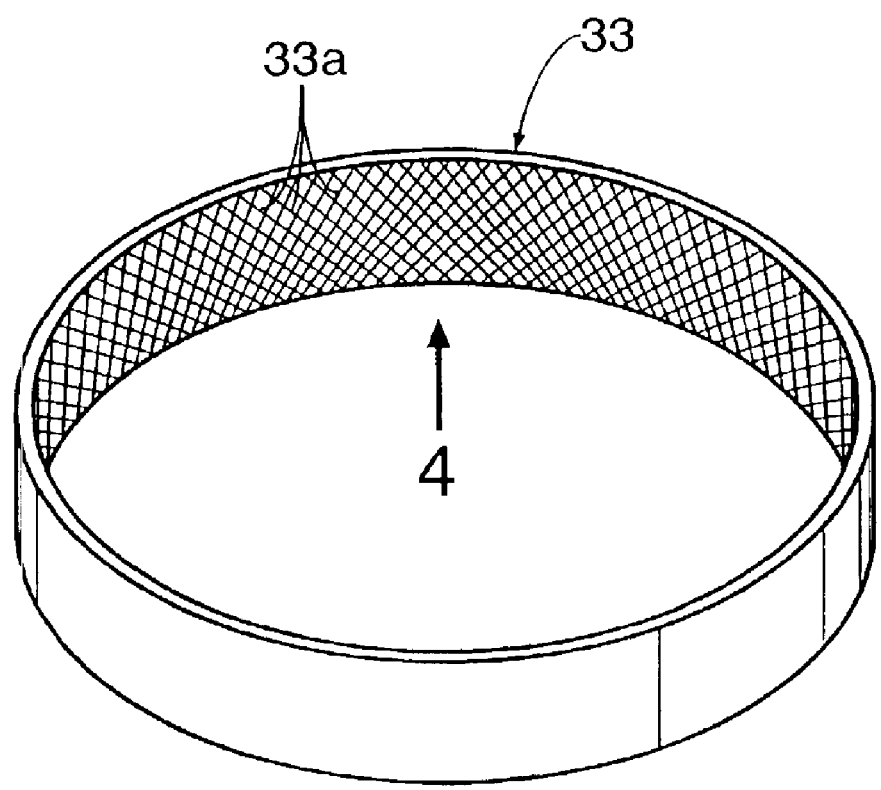
FIG. 3 is a perspective view of an innermost metal ring.

The definition of forward and backward directions, leftward and rightward directions and radial directions of a metal element used in the below-described embodiment is shown in FIG. 2. The radial directions are defined as radial directions of a pulley, against which the metal element abuts. A side closer to a rotational axis of the pulley is a radially inner side, and a side farther from the rotational axis of the pulley is a radially outer side. The leftward and rightward directions are defined as directions along the rotational axis of the pulley, against which the metal element abuts, and the forward and backward directions are defined as directions along a direction of travel of the metal element during forward traveling of a vehicle.

Figure 1:
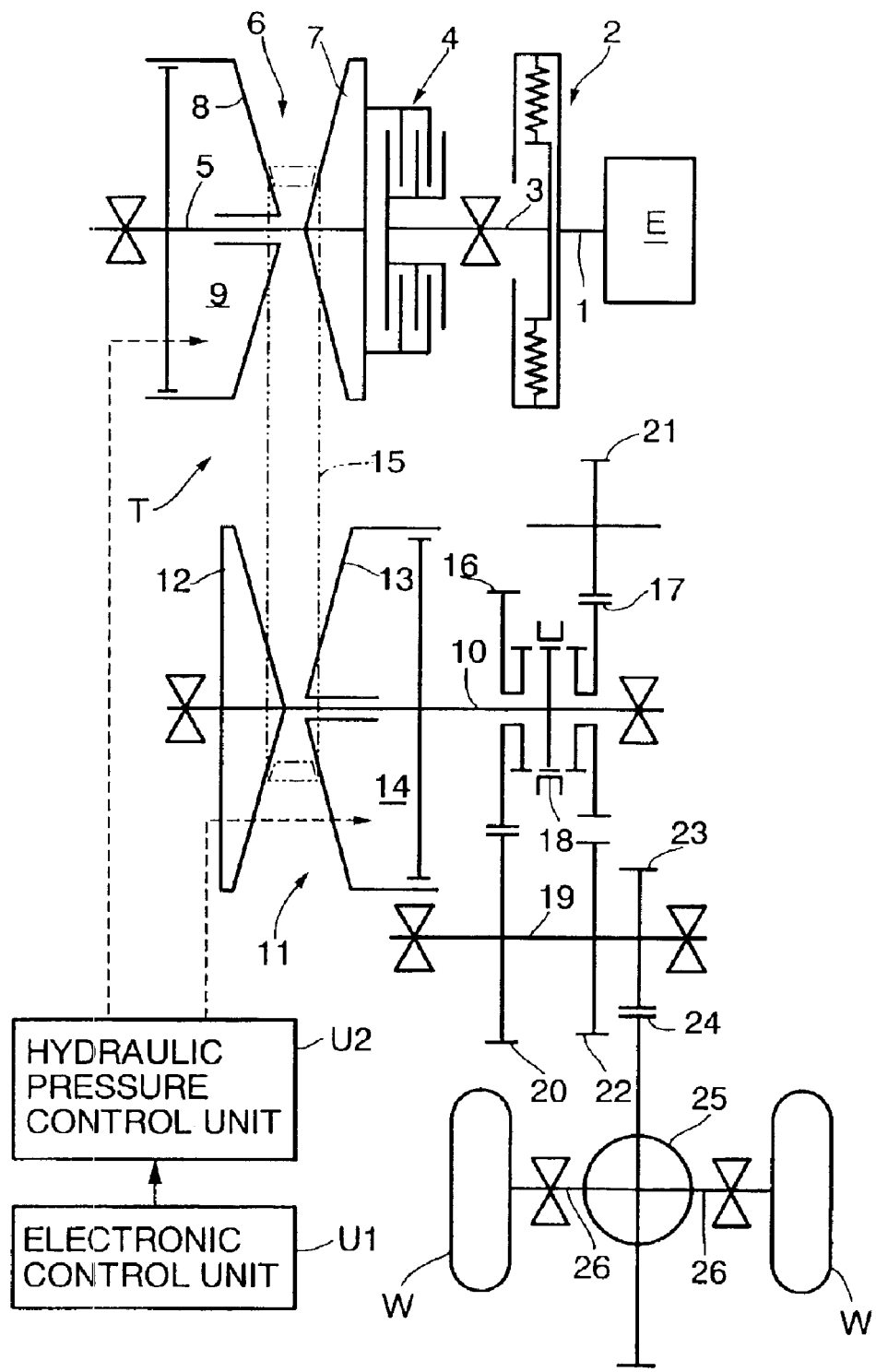
FIG. 1 is a schematic diagram of a power-transmitting system in a vehicle mounting a metal-belt-type continuously variable transmission.

FIG. 1 is a schematic diagram showing the structure of a metal-belt-type continuously variable transmission T mounted on an automobile. An input shaft 3 connected to a crankshaft 1 of an engine E through a damper 2 is connected to a driving shaft 5 of the metal-belt-type continuously variable transmission T through a starting clutch 4. A driving pulley 6 mounted on the driving shaft 5 includes a stationary pulley half 7 secured to the driving shaft 5, and a movable pulley half 8 which is movable toward and away from the stationary pulley half 7. The movable pulley half 8 is biased toward the stationary pulley half 7 by a hydraulic pressure applied to an oil chamber 9.

A driven pulley 11 mounted on a driven shaft 10 disposed in parallel to the driving shaft 5 includes a stationary pulley half 12 secured to the driven shaft 10 and movable pulley half 13 which is movable toward and away from the stationary pulley half 12. The movable pulley half 13 is biased toward the stationary pulley half 12 by a hydraulic pressure applied to an oil chamber 14. A metal belt 15 having a plurality of metal elements 32 supported on a pair of left and right metal ring assemblies 31, 31 is wound between the driving pulley 6 and the driven pulley 11 (see FIG. 2). Each metal ring assembly 31 includes twelve metal rings 33 laminated on one another.

Rotatable forward and backward driving gears 16 and 17 are relatively supported on the driven shaft 10. The forward and backward driving gears 16 and 17 can be selectively coupled to the driven shaft 10 by a selector 18. A forward driven gear 20, which is meshed with the forward driving gear 16, and a backward driven gear 22, which is meshed with the backward driving gear 17 through a backward idling gear 21, are secured to an output shaft 19 disposed in parallel to the driven shaft 10.

The rotation of the output shaft 19 is input to a differential 25 through a final driving gear 23 and a final driven gear 24, and is transmitted therefrom through left and right axles 26, 26 to driven wheels W, W.

A driving force of the engine E is transmitted to the driven shaft 10 through the crankshaft 1, the damper 2, the input shaft 3, the starting clutch 4, the driving shaft 5, the driving pulley 6, the metal belt 15, and the driven pulley 11. When a forward travel range is selected, the driving force of the driven shaft 10 is transmitted through the forward driving gear 16 and the forward driven gear 20 to the output shaft 19, wherein the vehicle travels forward. When a backward travel range is selected, the driving force of the driven shaft 10 is transmitted through the backward driving gear 17, the backward idling gear 21, and the backward driven gear 22 to the output shaft 19, wherein the vehicle travels backward.

At this time, hydraulic pressures applied to the oil chamber 9 in the driving pulley 6 and the oil chamber 14 in the driven pulley 11 of the metal-belt-type continuously variable transmission T are controlled by a hydraulic pressure control unit U2 operated by a command from an electronic control unit U1, wherein the gear ratio is continuously adjusted.

More specifically, if the hydraulic pressure applied to the oil chamber 14 in the driven pulley 11 is increased relative to the hydraulic pressure applied to the oil chamber 9 in the driving pulley 6, the groove width of the driven pulley 11 is reduced, resulting in an increased effective radius. Correspondingly, the grove width of the driving pulley 6 is increased, resulting in a reduced effective radius. Therefore, the gear ratio of the metal-belt-type continuously variable transmission T is continuously varied toward "LOW". On the other hand, if the hydraulic pressure applied to the oil chamber 9 in the driving pulley 6 is increased relative to the hydraulic pressure applied to the oil chamber 14 in the driven pulley 11, the groove width of the driving pulley 6 is reduced, resulting in an increased effective radius. Correspondingly, the groove width of the driven pulley 11 is increased, resulting in a reduced effective radius. Therefore, the gear ratio of the metal-belt-type continuously variable transmission T is continuously varied toward "OD" or overdrive.

As shown in FIG. 2, each metal element 32 is formed from a metal plate by punching and includes a substantially trapezoidal element body 34, a neck 36 located between a pair of left and right ring slots 35, 35 into which the metal ring assemblies 31, 31 are fitted, and a substantially triangular ear 37 connected to an upper portion of the element body 34 through the neck 36. The element body 34 is formed at laterally opposite ends with a pair of pulley abutment faces 39, 39 that abut against V-faces of the driving pulley 6 and the driven pulley 11. The metal element 32 is also formed, at front and rear portions relative to the travel direction, with main surfaces 40, respectively, which abut against the corresponding main surfaces of the adjacent metal element 32. An inclined face 42 is formed below the main surface 40 on the front portion with a laterally extending locking edge 41 located therebetween. Further, the ear 37 is formed, at front and rear surfaces, with a projection 43$f$ and a recess (not shown) capable of being fitted to each other to interconnect the metal elements 32, 32 adjacent each other in the forward and backward directions. Saddle faces 44, 44 that support the inner peripheral surfaces of the metal ring assemblies 31, 31 are formed at lower edges of the left and right ring slots 35, 35.

The metal ring 33 is curved in a region where the metal ring is wound around the driving pulley 6 and the driven pulley 11, and extends rectilinearly in a region of a chord between the driving pulley 6 and the driven pulley 11. Therefore, cracks are liable to be generated in the vicinity of a tip end of a protrusion 33$a$ of each metal ring 33 wherein the amplitude of bending stress is highest. Also, the cracks grow in lateral directions (i.e., directions perpendicular relative to the direction of travel of the metal rings 33). In a region where the two protrusions 33$a$, 33$a$, which are perpendicular relative to each other, intersect, lubrication is reduced, which results in the generation of cracks due to the large width of the protrusions 33$a$, 33$a$ as measured in the travel direction.

Figure 7:
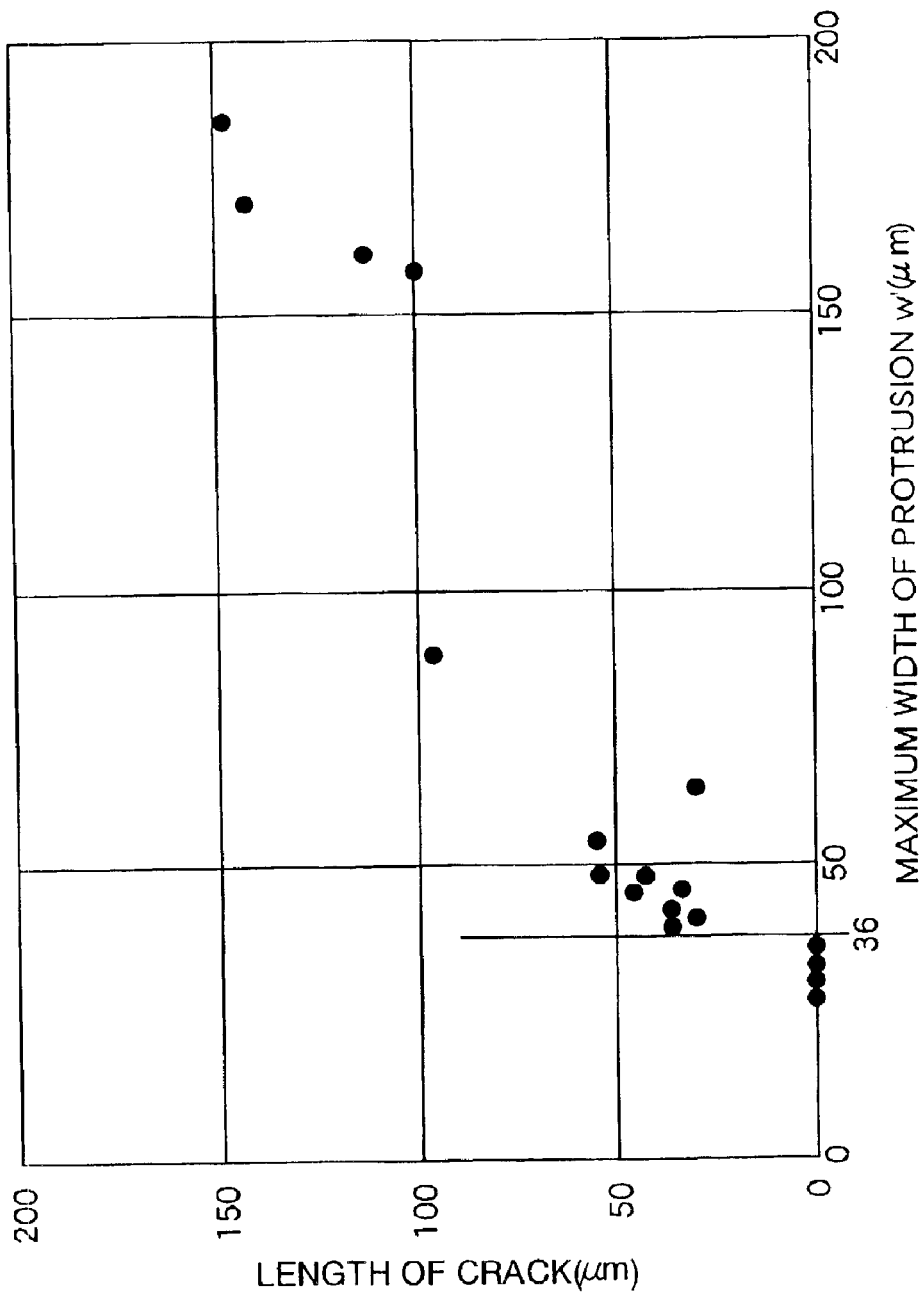
FIG. 7 is a graph showing the relationship between the width of protrusions on the metal ring and the length of cracks.

The axis of abscissas in FIG. 7 indicates the lateral maximum width w' (see FIG. 4) of a point at which the two protrusions 33$a$, 33$a$ of the metal ring 33, which are perpendicular to each other, intersect each other after initially being worn, and the axis of ordinates indicates the length of a crack. As shown in FIG. 7, it can be seen that if the maximum width w' at the point of intersection of the protrusions 33$a$, 33$a$ exceeds 36 $\mu$m, cracks of approximately 30 $\mu$m or more are generated, but if the maximum width w' is equal to or smaller than 36 $\mu$m, a crack is not generated.

Figure 4:
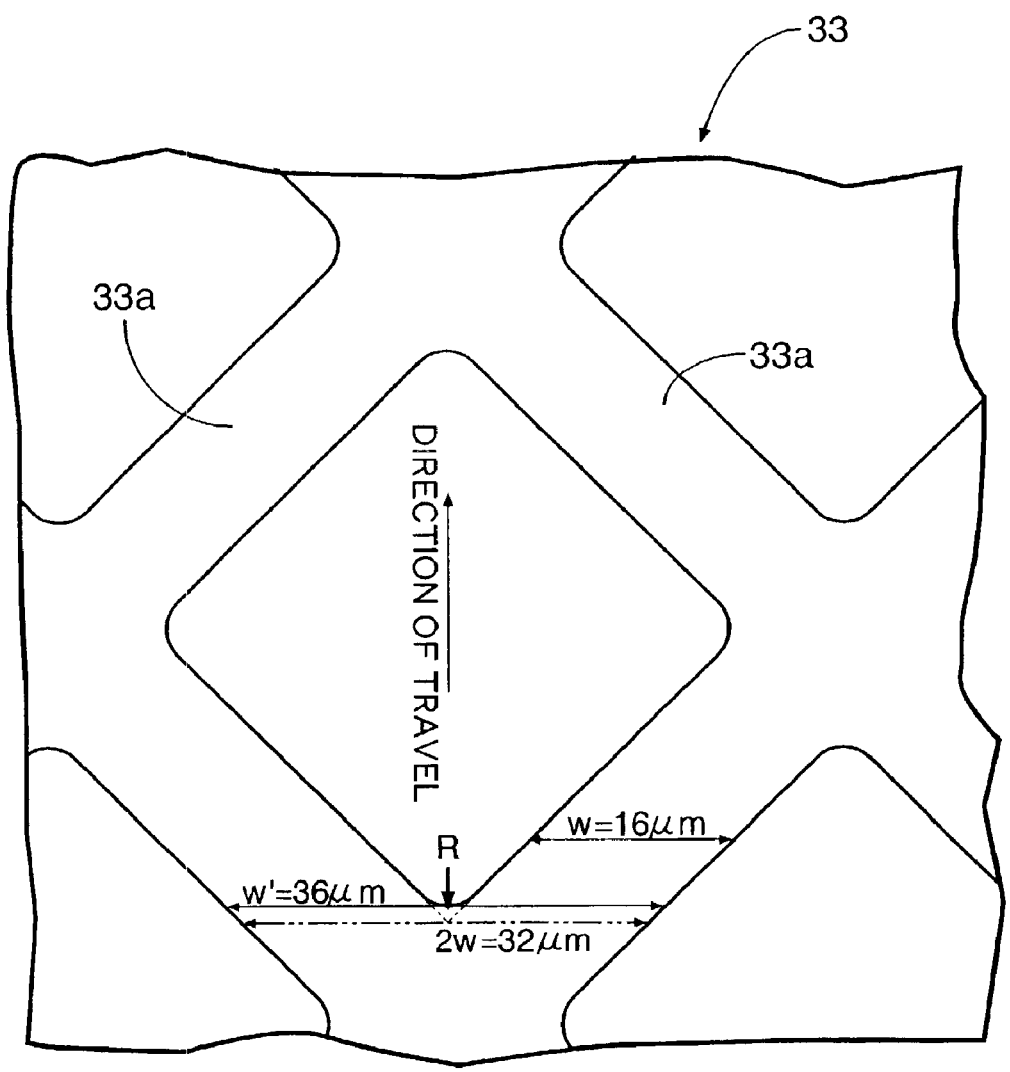
FIG. 4 is an enlarged view of the innermost metal ring shown in FIG. 3 taken in a direction of arrow 4.

As shown in FIG. 4, the maximum width w' of the intersection point equal to 36 μm corresponds to a lateral average contact width w of the protrusion 33a being approximately equal to 16 μm. The width w' is not equal to 2w because the point at which the protrusions 33a, 33a intersect each other does not have an acute corner and has a radius R of curvature.

The generation of cracks is inhibited if the lateral average contact width w of the protrusion 33a after initially being worn is equal to or smaller than 16 μm because, even if pitching is generated at a top of the narrow protrusion 33a, the pitching does not extend in a depthwise direction as the width of the top of the protrusion 33a is narrow. As a result, a shallow pitching is scratched away and eliminated due to the contact between the protrusion 33a and the saddle face 44 of the metal element 32. If the width of the protrusion 33a, as measured in a direction perpendicular to the direction of travel of the metal ring 33, is reduced, the width of the protrusion 33a, as measured in the direction of travel, is also reduced. Accordingly, it is possible to inhibit the cutting of an oil membrane at the top of the protrusion, which prevents the generation of cracks. The metal ring 33 and the metal element 32 are conformed to each other, and the average Hertz's surface pressure is lowered, wherein pitching is difficult to generate. In addition, the top of the protrusion 33a is worn, resulting in a very good and desirable surface roughness. Hence, lubrication is enhanced, which stops any further progress of the wearing down of the metal ring 33.

The definition of the lateral average contact width w of the protrusions after being initially worn will now be described with reference to FIGS. 5 and 6.

Figure 5:
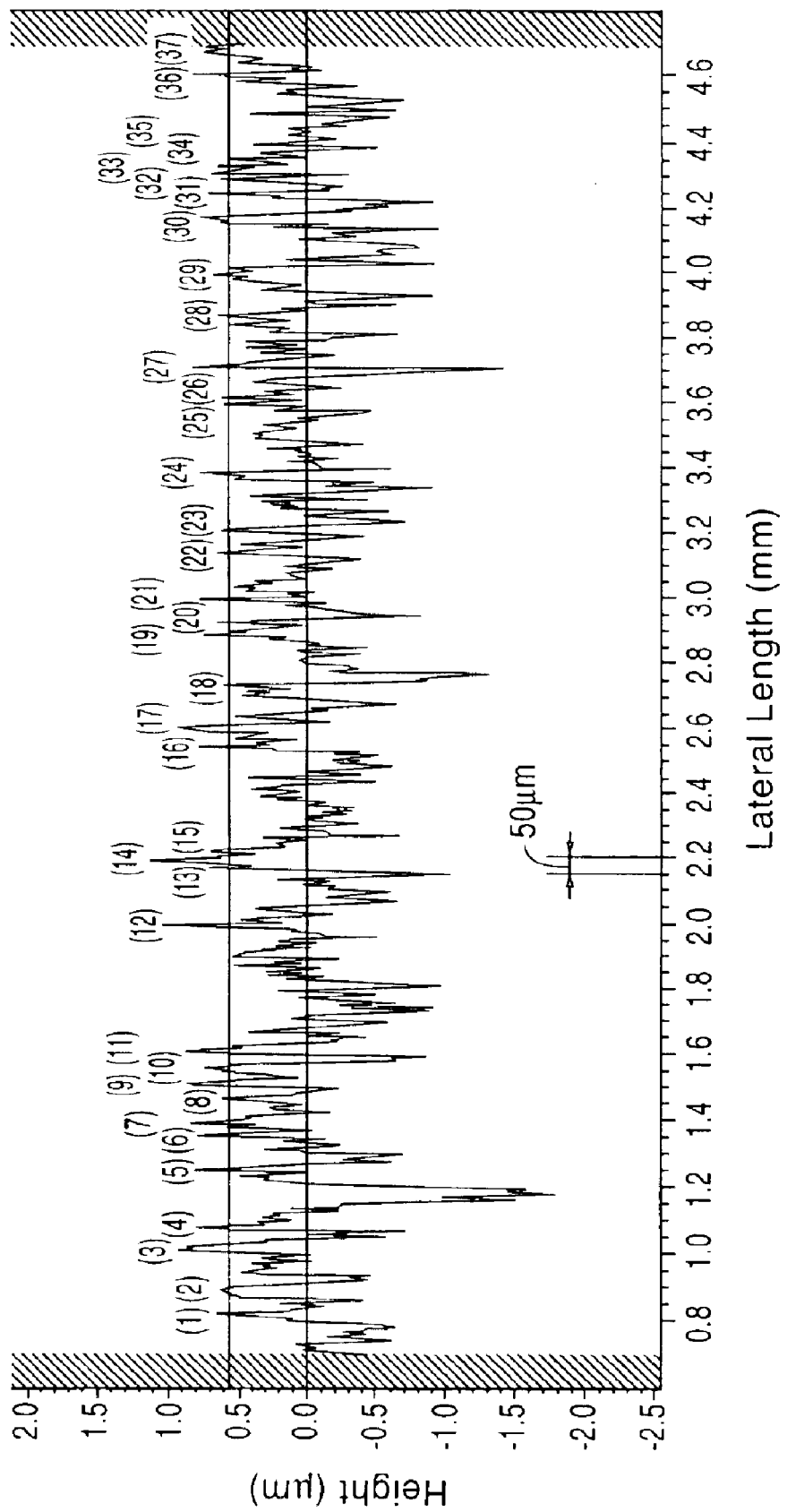
FIG. 5 is a graph showing a rugged state of an inner peripheral surface of the innermost metal ring.

FIG. 5 shows an enlarged ragged shape of a portion (i.e., a region having a lateral length L of 4 mm) of a cross-section of an inner peripheral surface of the innermost metal ring 33, wherein thirty seven (i.e., a high spot count HSC) points of intersection of the protrusions 33a having a height exceeding a predetermined height exist within the lateral length L of 4 mm. FIG. 6 is a load curve corresponding to the graph of FIG. 5. An initially worn state is defined as a state in which each of the tops of the 37 protrusions 33a has been worn in an amount corresponding to an initial wear height Rpk in the maximum value of the ruggedness (i.e., a difference between a highest point and a lowest point in the ruggedness), in particular, a state in which each of the tops of the 37 protrusions 33a has been worn in an amount corresponding to an initial wear area Al shown by oblique lines.

A load length rate 1, Mr1 is a percent of a total of widths of the worn tops at the points of intersection of the 37 (high spot count HSC) protrusions 33a, based on the lateral length L (4 mm). The first definition of the high spot count HSC is the number of the protrusions 33a having a height exceeding a height of the load curve in the load length rate 1, Mr1. The second definition is the number of the protrusions having a height exceeding a height which is obtained by adding one half of an effective load roughness Rk to a height (i.e., an origin of the axis of ordinates in FIG. 5) at which a total of areas of projections and a total of areas of recesses in sections of the protrusions 33a are equal to each other. If either of the two definitions is used to define the high spot count HSC, a value of the resulting high spot count HSC is substantially consistent.

Figure 6:
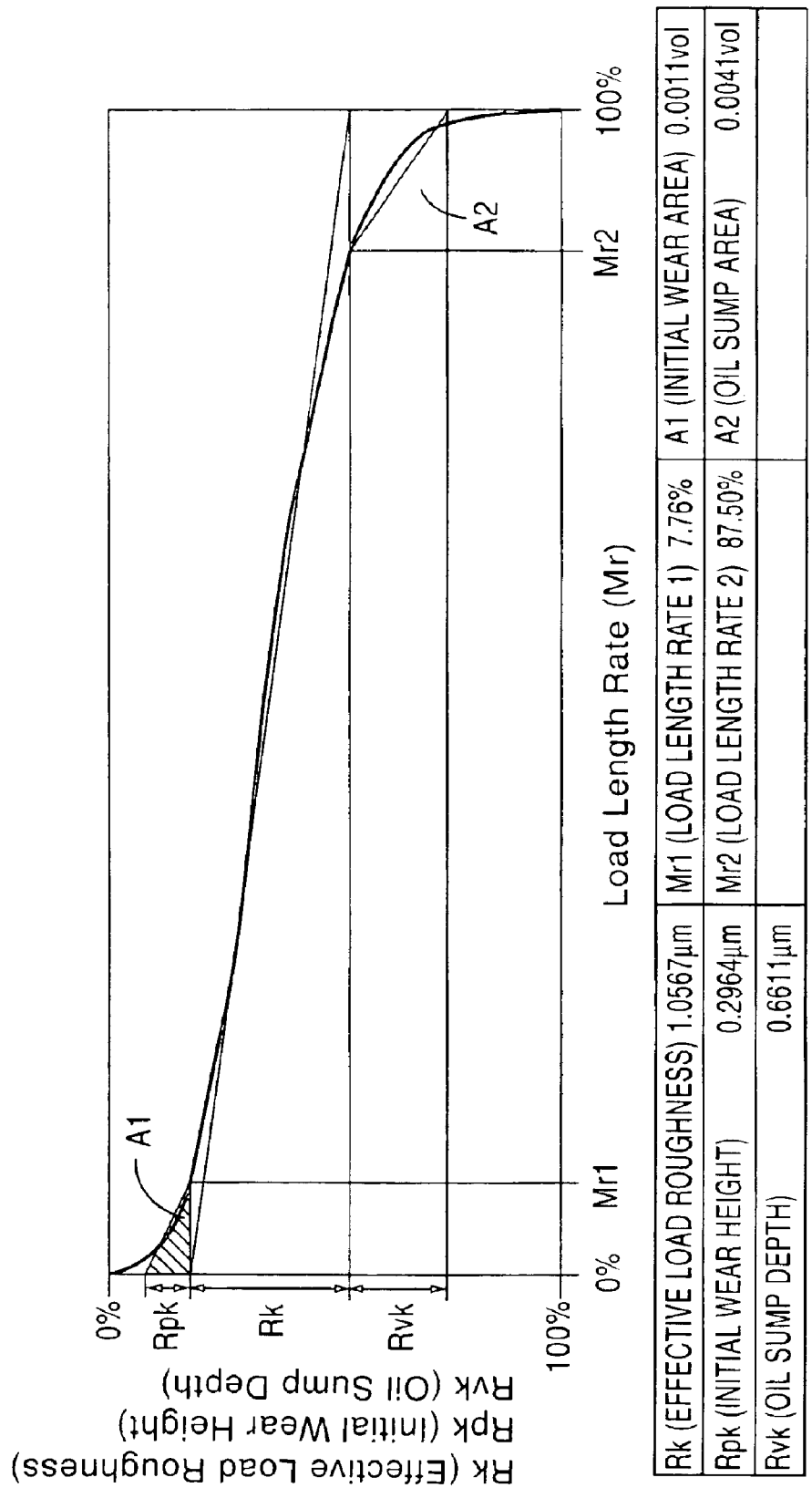
FIG. 6 is a load curve corresponding to FIG. 5.

In an example in FIG. 6, the load length rate 1, Mr1 is 7.76% and hence, 0.3104 mm corresponding to 7.76% of the lateral length L (4 mm) is a total of the widths of the worn tops at the points of intersection of the 37 protrusions 33a. Therefore, a width per top at the point of intersection of the protrusions 33a (namely, w') is 0.3104 mm÷37 =0.0084 mm=8.4 μm. Thus, an average contact width w is w'/2=4.2 μm, which is smaller than 16 μm and hence, the generation of cracks is inhibited.

Figure 8:
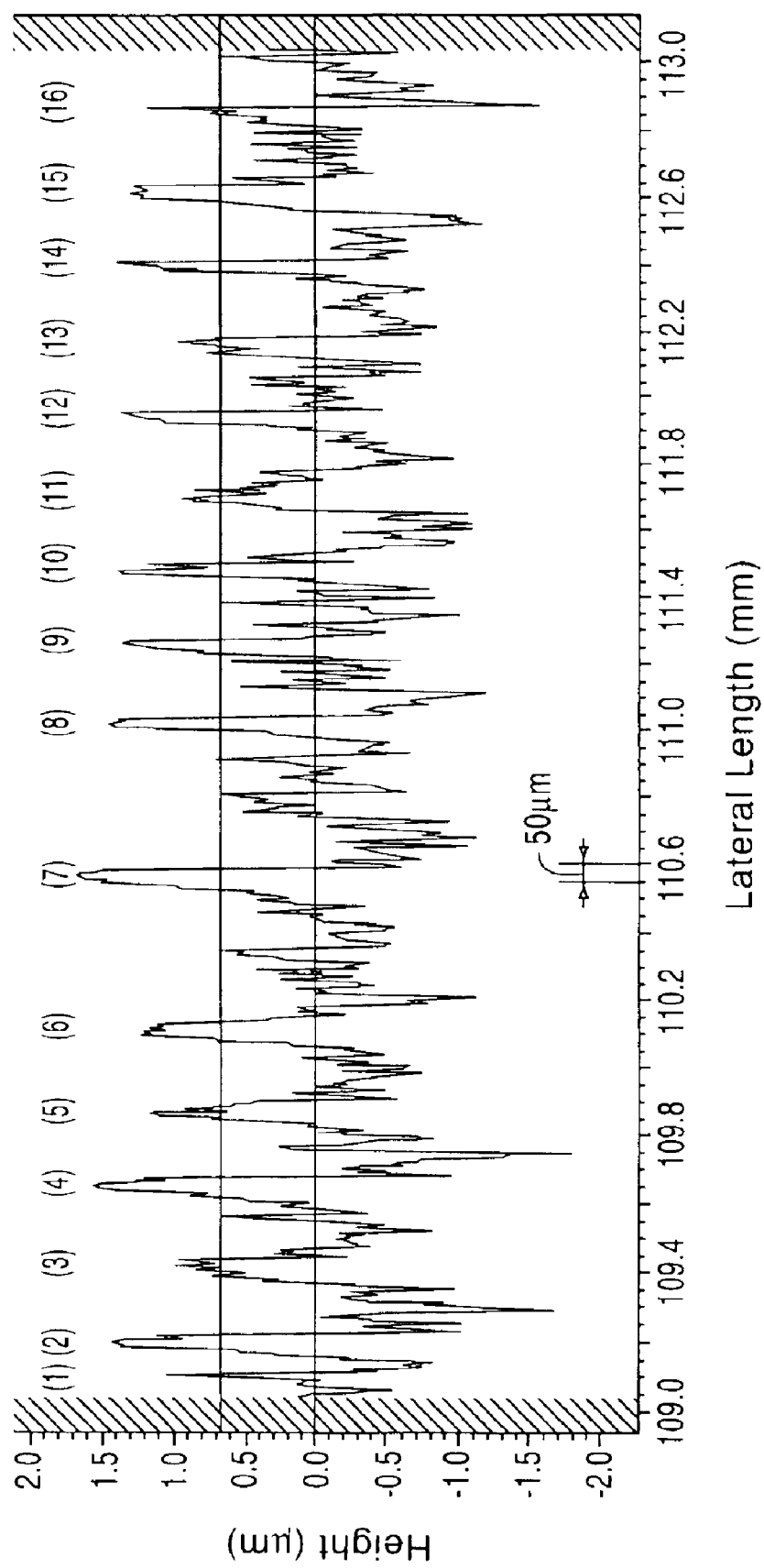
FIG. 8 is a graph showing a state of an innermost metal ring where cracks cannot be inhibited.

In an example in FIGS. 7 to 9, a high spot count HSC is equal to 16, and a load length rate 1, Mr1 is 16.08% and hence, 0.6432 corresponding to 16.08% of the lateral length L (4 mm) is a total of the widths of the worn tops at the points of intersection of the 16 protrusions 33a. Therefore, a width per top at the point of intersection of the protrusions 33a (namely, w') is 0.6432 mm÷16 =0.0402 mm=40.2 μm. Thus, in this case, an average contact width w is w'/2=20.1 μm, which exceeds 16 μm. Accordingly, this example is an example wherein, disadvantageously, the generation of cracks cannot be inhibited.

Although the preferred embodiment of the present invention has been described in detail, it will be understood that various modifications in design may be made without departing from the spirit and scope of the present invention.

For example, in the preferred embodiment, the protrusions 33a are formed only on the inner peripheral surface of the innermost metal ring 33. However, protrusions may be formed on an outer peripheral surface of the innermost metal ring 33 or on any surface of the other metal ring.

In addition, the protrusions 33a need not necessarily be formed in the two directions to intersect each other, and may be formed in one direction.

What is claimed is:

1. A belt for a continuously variable transmission, comprising a plurality of metal elements supported on a metal ring assembly having a plurality of metal rings laminated on one another and which transmit a driving force between a driving pulley and a driven pulley, wherein at least an innermost metal ring has a plurality of protrusions formed on an inner peripheral surface thereof, wherein an average contact width w of said protrusions, after being initially worn and being measured in a direction perpendicular to a direction of travel of the metal rings, is defined by an equation:

$$w = L \times (Mr1/HSC)$$

wherein L is a length of at least a portion of the metal ring measured in a direction perpendicular relative to the direction of travel of the metal rings, Mr1 is a load length rate 1 within the length L of the inner peripheral surface of the metal ring, and HSC is a high spot count within said length L of said inner peripheral surface of the metal ring, wherein said high spot count HSC is defined by either one of a number of said protrusions having a height exceeding a height at the load length rate 1, Mr1 or a number of said protrusions having a height exceeding a total height obtained by adding one half of an effective load roughness Rk to a height at which a total area of said projections and a total area of recesses in sections of said protrusions are equal to each other, and wherein said average contact width w is equal to or less than 16 μm.

* * * * *